United States Patent
Kaidu et al.

(10) Patent No.: US 10,910,979 B2
(45) Date of Patent: Feb. 2, 2021

(54) MOTOR DRIVE CONTROL DEVICE AND MOTOR DRIVE CONTROL METHOD

(71) Applicant: Minebea Mitsumi Inc., Nagano (JP)

(72) Inventors: Hiroyuki Kaidu, Iwata (JP); Masato Aoki, Iwata (JP); Youhei Serizawa, Kakegawa (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/813,880

(22) Filed: Nov. 15, 2017

(65) Prior Publication Data

US 2018/0138847 A1    May 17, 2018

(30) Foreign Application Priority Data

Nov. 17, 2016 (JP) ................. 2016-224361

(51) Int. Cl.
| | | |
|---|---|---|
| *H02P 6/16* | (2016.01) | |
| *H02H 7/093* | (2006.01) | |
| *H02P 6/14* | (2016.01) | |
| *H02P 23/04* | (2006.01) | |
| *H02P 6/12* | (2006.01) | |
| *H02P 6/15* | (2016.01) | |
| *H02P 3/18* | (2006.01) | |

(Continued)

(52) U.S. Cl.
CPC .............. *H02P 23/04* (2013.01); *H02P 3/025* (2013.01); *H02P 3/18* (2013.01); *H02P 6/12* (2013.01); *H02P 6/15* (2016.02); *H02P 6/16* (2013.01); *H02P 25/04* (2013.01)

(58) Field of Classification Search
CPC .................................... H02P 21/16; H02P 6/17
See application file for complete search history.

(56) References Cited

U.S. PATENT DOCUMENTS

2002/0116100 A1*  8/2002  Shimazaki .......... B60L 15/2045
                                                                701/22
2004/0090198 A1   5/2004  Kaku et al.
(Continued)

FOREIGN PATENT DOCUMENTS

| CN | 1529932 A | 9/2004 |
|---|---|---|
| CN | 1801024 A | 7/2006 |

(Continued)

OTHER PUBLICATIONS

Chinese Office Action dated Apr. 8, 2020 for corresponding Chinese Application No. 201711119600.X and English translation.
(Continued)

*Primary Examiner* — Bickey Dhakal
*Assistant Examiner* — Charles S Laughlin
(74) *Attorney, Agent, or Firm* — Pearne & Gordon LLP

(57) ABSTRACT

According to an aspect of the present disclosure, a motor drive control device driving a motor using position information detected by one sensor includes: a current detection unit detecting a magnitude of a coil current flowing through a coil of the motor; a rotation position detection unit detecting a rotation position of the motor based on the position information; and a hunting determination unit determining, based on the magnitude of the coil current, the rotation position of the motor, and a driving command for driving the motor, whether or not the motor is in a hunting condition.

7 Claims, 6 Drawing Sheets

(51) Int. Cl.
*H02P 3/02* (2006.01)
*H02P 25/04* (2006.01)

(56) References Cited

U.S. PATENT DOCUMENTS

| | | | |
|---|---|---|---|
| 2004/0155613 A1* | 8/2004 | Sugiyama | B62D 5/046 |
| | | | 318/400.14 |
| 2006/0119307 A1 | 6/2006 | Kiyotani et al. | |
| 2011/0043159 A1* | 2/2011 | Shoda | G05B 5/01 |
| | | | 318/624 |
| 2012/0182649 A1* | 7/2012 | Imai | H02P 29/028 |
| | | | 361/23 |
| 2014/0139153 A1 | 5/2014 | Aoki | |
| 2014/0292237 A1 | 10/2014 | Yamazaki et al. | |
| 2015/0256113 A1* | 9/2015 | Takase | H02P 27/04 |
| | | | 318/400.02 |

FOREIGN PATENT DOCUMENTS

| | | |
|---|---|---|
| CN | 102882460 A | 1/2013 |
| CN | 103825507 A | 5/2014 |
| CN | 104079217 A | 10/2014 |
| JP | 2002-354874 A | 12/2002 |
| JP | 2006-340422 A | 12/2006 |
| JP | 2013-005552 A | 1/2013 |

OTHER PUBLICATIONS

Wen-li et al.; "Stability improvement control for metro traction drive system"; Electric Machines and Control; vol. 16, No. 2, Feb. 2012, pp. 56-61.
Chinese Office Action dated Sep. 4, 2020 for corresponding Chinese Application No. 201711119600.X and English translation.

\* cited by examiner

MOTOR DRIVE CONTROL DEVICE AND MOTOR DRIVE CONTROL METHOD

CROSS REFERENCE TO RELATED APPLICATIONS

This application claims the benefit of Japanese Patent Application No. 2016-224361, filed Nov. 17, 2016, which is hereby incorporated by reference in its entirety.

BACKGROUND

Technical Field

The present disclosure relates to a motor drive control device and a motor drive control method, and more particularly, to a motor drive control device and a motor drive control method of driving a motor using a detection result of a rotation position of a motor obtained from one sensor.

Background

A so-called hunting condition may occur in a motor at the time of driving the motor. The hunting condition means that when a driving command for driving the motor is present, a rotor of the motor repeats a reciprocating rotation operation between a particular rotation position and a position before the particular rotation position without rotating beyond the particular rotation position, resulting in not stopping the motor completely. For example, when a driven body such as a fan rotated by the motor is rotated in a forward direction to reach a particular rotation position, the driven body hits an obstacle or the like at the particular rotation position, is slightly reversely rotated by a reaction when the driven body hits the obstacle or the like, and is rotated in the forward direction again by the drive force of the motor until the driven body hits the obstacle or the like. The hunting condition occurs when the driven body is thus repeatedly rotated in the forward and reverse directions.

Japanese Patent Application Laid-Open No. 2002-354874 discloses a method of detecting a hunting condition of a brushless motor based on a rotational speed of a motor. This method is a method of detecting the rotational speed of the motor, comparing the detected rotational speed with a predetermined rotational speed for determining an abnormal condition, and determining whether an abnormal condition such as the detected rotational speed being lower than the predetermined rotational speed occurs.

If the above-described hunting condition has occurred when a plurality of hall elements or the like, for example, are used to detect the rotation position of the motor, the motor can be stopped by detecting that the hunting condition has occurred. However, in a simple drive control circuit used for driving, for example, a single-phase motor, including sensors such as the hall elements used for the drive control, the number of sensors being limited, for example, one, the hunting condition cannot be easily detected in some cases.

Specifically, in the case of driving the motor using a detection result of the rotation position of the motor obtained from one sensor, when the sensor is located at an advanced position, the sensor outputs the detection signal indicating as if the motor were rotated at a low speed depending on the position where the rotation of the motor is locked. In other words, the signal detected by the sensor in the hunting condition may be substantially the same as the signal detected by the sensor when the motor is rotated at the low speed in some cases, and both the signals cannot be distinguished. When the hunting condition has thus occurred, but cannot be detected, the drive control circuit of the motor performs control to increase the current flowing through the motor to rotate the motor at high speed in accordance with an instruction for rotating the motor at the high speed if the instruction is externally input. Therefore, the motor and the drive circuit of the motor generate heat.

In a method disclosed in Japanese Patent Application Laid-Open No. 2002-354874, the hunting condition is determined based on the rotational speed of the motor, and therefore the determination accuracy cannot be improved.

The present disclosure is related to providing a motor drive control device and a motor drive control method capable of detecting a hunting condition in a simple configuration and with high accuracy.

SUMMARY

According to a first aspect of the present disclosure, a motor drive control device driving a motor using position information detected by one sensor includes: a current detection unit detecting a magnitude of a coil current flowing through a coil of the motor; a rotation position detection unit detecting a rotation position of the motor based on the position information; and a hunting determination unit determining, based on the magnitude of the coil current, the rotation position of the motor, and a driving command for driving the motor, whether or not the motor is in a hunting condition.

Preferably, the hunting determination unit includes: a current determination unit comparing the coil current with a first current threshold to determine whether or not a first determination condition is satisfied; and a position determination unit determining whether or not a second determination condition is satisfied based on a detection result of the rotation position of the motor and the driving command, and determines that the motor is in the hunting condition when the first determination condition is satisfied and the second determination condition is satisfied.

Preferably, the hunting determination unit determines that the motor is in the hunting condition when the first determination condition and the second determination condition are satisfied for a predetermined time.

Preferably, the position determination unit determines whether or not the second determination condition is satisfied based on a comparison result of a pseudo rotational speed of the motor obtained based on the detection result of the rotation position of the motor with a predetermined rotational speed threshold, and the driving command.

Preferably, the motor drive control device further includes a predrive circuit driving an inverter circuit supplying power to the motor, the predrive circuit includes an overcurrent determination unit comparing the coil current with a second current threshold to determine whether or not the motor is in an overcurrent state, and the second current threshold is larger than the first current threshold.

Preferably, the motor drive control device further includes: a predrive circuit driving an inverter circuit supplying power to the motor; and a motor control unit outputting to the predrive circuit a drive control signal for controlling the drive of the motor based on the driving command, the motor control unit outputs the drive control signal for stopping the motor when the hunting determination unit determines that the motor is in the hunting condition.

Preferably, the motor control unit maintains a state of outputting the drive control signal for stopping the motor for a predetermined first period of time when the hunting determination unit determines that the motor is in the hunting condition, and the predetermined first period of time is longer than a predetermined second period of time from the time the control is performed to stop the motor when the motor is locked to the time the control is performed to restart the motor.

According to a second aspect of the present disclosure, a control method for a motor drive control device driving a motor using position information detected by one sensor includes: a current detection step of detecting a magnitude of a coil current flowing through a coil of the motor; a rotation position detection step of detecting a rotation position of the motor based on the position information; and a hunting determination step of determining, based on the magnitude of the coil current, the rotation position of the motor, and a driving command for driving the motor, whether or not the motor is in a hunting condition.

According to these disclosures, it is possible to provide a motor drive control device and a motor drive control method capable of detecting a hunting condition in a simple configuration and with high accuracy.

DETAILED DESCRIPTION

Hereinafter, a motor drive control device according to embodiments of the present disclosure will be described.

Embodiments

Figure 1:
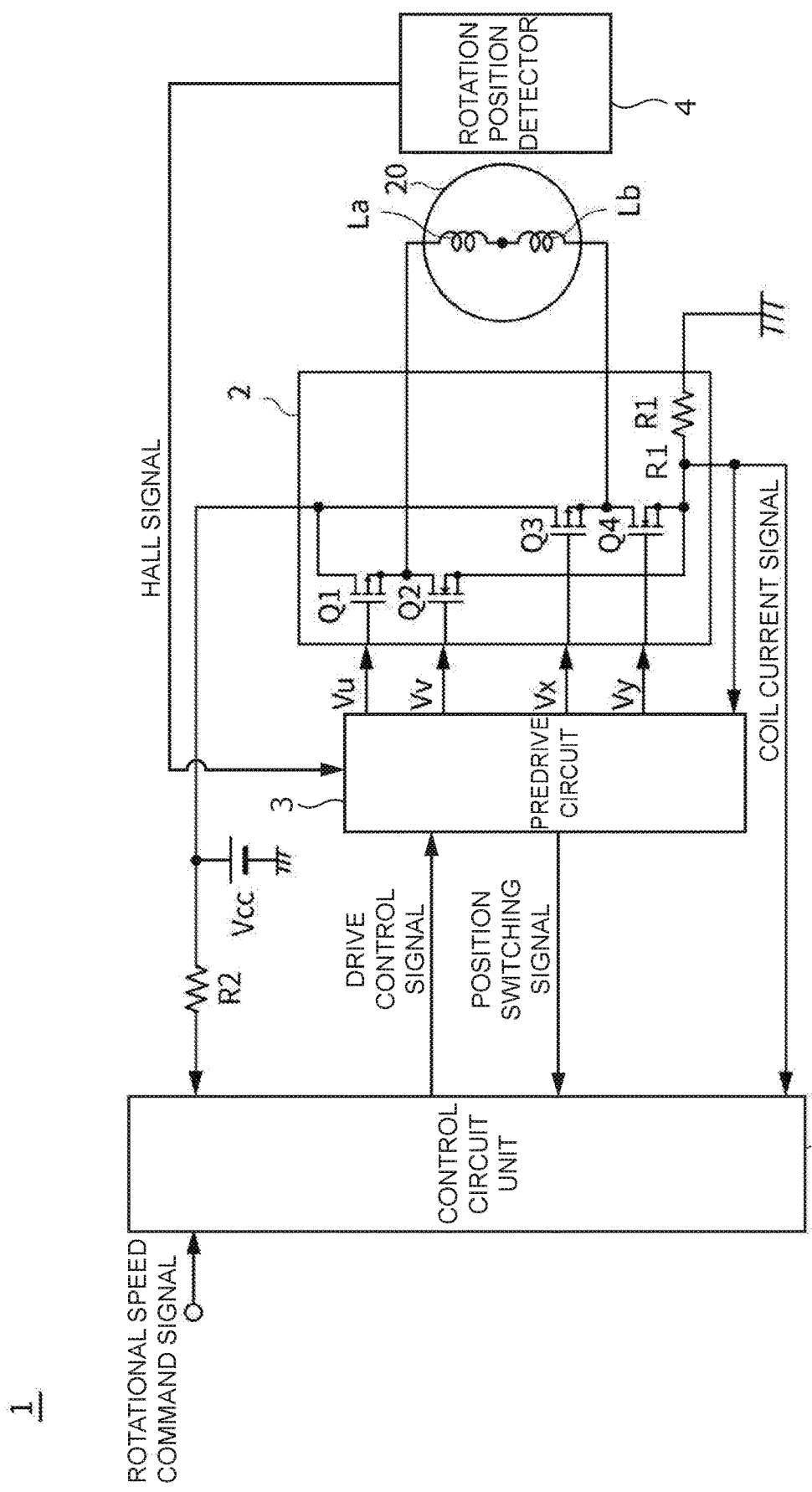
FIG. 1 is a block diagram illustrating a circuit configuration of a motor drive control device according to one embodiment of the present disclosure.

FIG. 1 is a block diagram illustrating a circuit configuration of a motor drive control device according to one embodiment of the present disclosure.

As illustrated in FIG. 1, a motor drive control device 1 is formed to output driving power to a motor 20 being, for example, a single-phase brushless motor to drive the motor 20. In the motor drive control device 1, the motor 20 is rotated by making a driving current flow through armature coils La, Lb of the motor 20 based on a signal output from a rotation position detector (an example of sensors) 4 in accordance with a rotation of a rotor.

The motor drive control device 1 includes an inverter circuit 2 and a predrive circuit 3 forming a motor drive unit driving the motor 20, and a control circuit unit 5 controlling the drive of the motor 20. Note that constituent elements of the motor drive control device 1 illustrated in FIG. 1 are a part of the entire motor drive control device 1, and the motor drive control device 1 may include other constituent elements in addition to the constituent elements illustrated in FIG. 1.

In the present embodiment, the inverter circuit 2 and the predrive circuit 3 together form a packaged integrated circuit device (IC). The control circuit unit 5 also is an integrated circuit device. Note that the whole motor drive control device 1 may be packaged as one integrated circuit device, or one integrated circuit device (IC) may be formed by packaging the whole or a part of the motor drive control device 1 together with another device.

The inverter circuit 2 and the predrive circuit 3 together form the motor drive unit. The inverter circuit 2 outputs the driving power to the motor 20 based on an output signal output from the predrive circuit 3 to energize armature coils La, Lb provided in the motor 20. In the inverter circuit 2, a pair of series circuits connected across a power supply source Vcc, the series circuits having two upper switch elements and two lower switch elements (a pair of switch elements Q1, Q2, and a pair of switch elements Q3, Q4), respectively, are disposed with respect to respective phases of the armature coils La, Lb. A terminal of each phase of the motor 20 is connected to a connecting point between each pair of two switch elements. Specifically, a terminal of the coil La is connected to a connecting point between the switch elements Q1, Q2. A terminal of the coil Lb is connected to a connecting point between the switch elements Q3, Q4.

In the inverter circuit 2, a coil current detection resistor R1 is provided between the switch elements Q2, Q4 and a ground potential. Then, a voltage corresponding to a current flowing through the coils La, Lb is output as a coil current signal from the inverter circuit 2.

A drive control signal is input to the predrive circuit 3. The predrive circuit 3 generates output signals Vu, Vv, Vx, Vy for driving the inverter circuit 2 based on the drive control signal, and outputs these output signals to the inverter circuit 2. When these output signals are output, the switch elements Q1, Q2, Q3, Q4 corresponding to these output signals, respectively, perform an on/off operation to output the driving power to the motor 20 and supply the power to each phase of the motor 20.

In the present embodiment, a rotation position detector 4 is a hall element, for example. A hall signal is output from the rotation position detector 4 according to the rotation of the rotor. The hall signal is input to the predrive circuit 3. Note that the hall signal may be adapted to be input to the control circuit unit 5. This hall signal contains position information corresponding to the rotational position of the rotor. Only one rotation position detector 4 is provided in the motor drive control device 1.

A position switching signal and a coil current signal are input to the control circuit unit 5, the position switching signal being output from the predrive circuit 3, and the coil current signal being output from the inverter circuit 2. A rotational speed command signal is input to the control circuit unit 5 as a driving command of the motor 20. The rotational speed command signal is a signal corresponding to a target value of the rotational speed of the motor 20. The rotational speed command signal is input from a side of an apparatus using the motor 20 and the motor drive control device 1.

The control circuit unit 5 is connected to the DC power supply source Vcc through a resistor R2.

Figure 2:
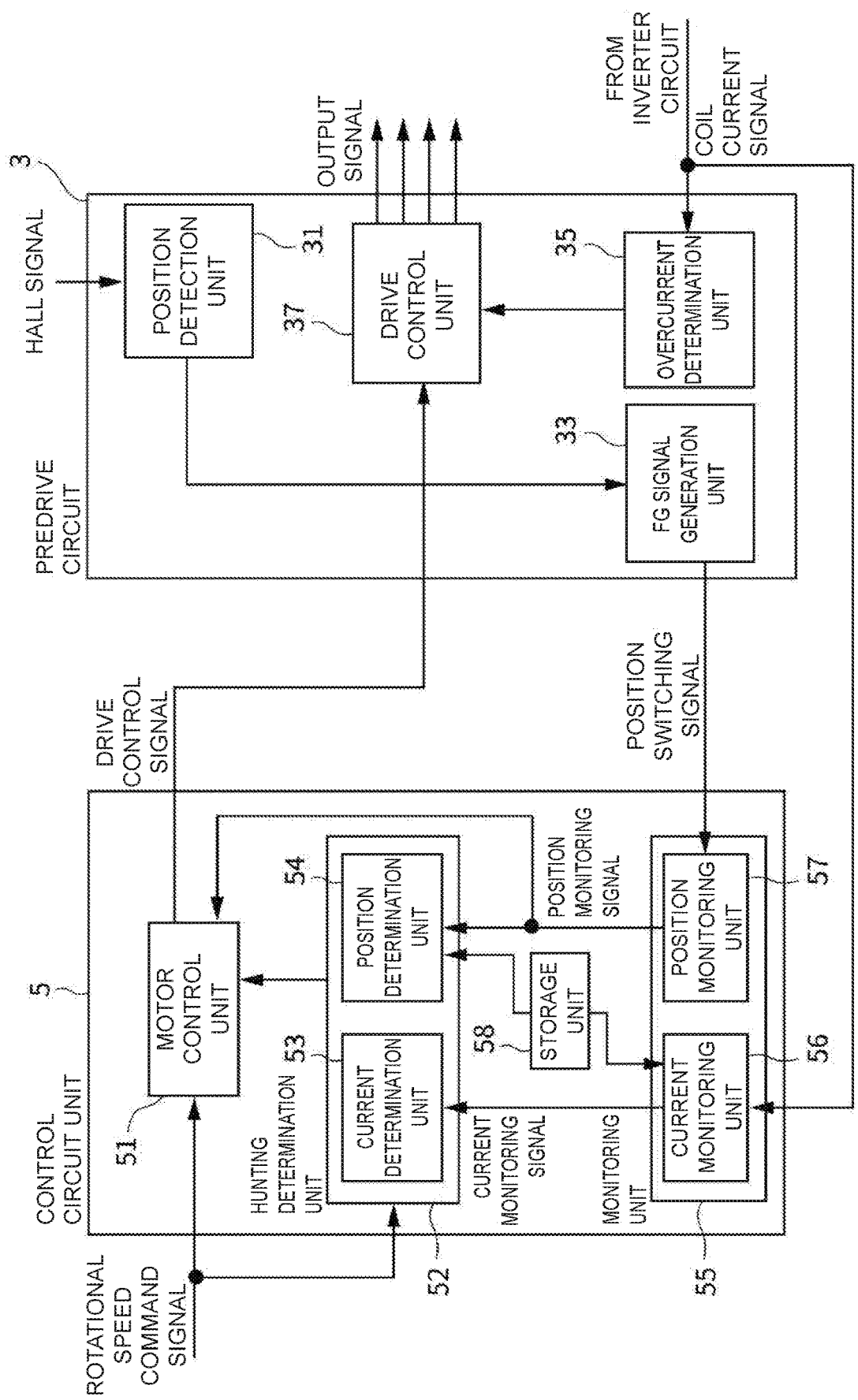
FIG. 2 is a block diagram illuminating a configuration of a predrive circuit and a control circuit unit.

FIG. 2 is a block diagram illuminating a configuration of the predrive circuit 3 and the control circuit unit 5.

As illustrated in FIG. 2, the predrive circuit 3 includes a position detection unit 31, an FG signal generation unit 33, an overcurrent determination unit 35, and a drive control unit 37.

The hall signal is input to the position detection unit 31. The position detection unit 31 inputs to the FG signal generation unit 33 a signal indicating a position of the rotor based on the hall signal. The FG signal generation unit 33 generates and outputs the position switching signal indicating the switching of the hall signal based on the input signal. The position switching signal is, for example, an FG signal, and contains information indicating the switching of the rotation position of the rotor. The generated position switching signal is input to the control circuit unit 5 from the predrive circuit 3. Note that the position switching signal may be a signal (hall FG) generated using output of the rotation position detector 4 being the hall element thus disposed in the motor 20, or a signal (pattern FG) generated using a coil pattern provided on a circuit board disposed on a side of the rotor.

A signal similar to the position switching signal is output toward a user device from the FG signal generation unit 33.

The drive control signal output from the control circuit unit 5 is input to the drive control unit 37. The drive control unit 37 generates and outputs the output signals Vu, Vv, Vx, Vy for driving the switch elements Q1, Q2, Q3, Q4 of the inverter circuit 2, respectively, based on the drive control signal.

The predrive circuit 3 includes the overcurrent determination unit 35 comparing a coil current with a second current threshold to determine whether or not the motor 20 is in an overcurrent state. Specifically, the overcurrent determination unit 35 is, for example, a comparator. The coil current signal output from the inverter circuit 2 is input to the overcurrent determination unit 35. The overcurrent determination unit 35 compares a value of the coil current signal with a predetermined second current threshold. The second current threshold is a value larger than a first current threshold described later.

The overcurrent determination unit 35 determines that an overcurrent flows through a motor coil when the value of the coil current signal exceeds the second current threshold. In this case, the overcurrent determination unit 35 outputs to the drive control unit 37 a signal indicating that the overcurrent flows. The drive control unit 37 controls stoppage of the drive of the motor 20 or reduction of the coil current regardless of the drive control signal based on the signal output from the overcurrent determination unit 35.

The control circuit unit 5 is an MCU (Microprogram Control Unit) in a simple configuration, and includes a motor control unit 51, a hunting determination unit 52, a monitoring unit 55, and a storage unit 58. When the hunting condition has occurred where the rotational speed of the motor 20 is low with respect to the output rotational speed command signal, but the motor 20 is not completely stopped, the control circuit unit 5 detects that the hunting condition has occurred. When the hunting condition has occurred, the control circuit unit 5 controls stoppage of the drive of the motor 20 or reduction of the coil current regardless of the rotational speed command signal, and outputs the drive control signal.

Predetermined values and the like used for the control in the control circuit unit 5 are previously stored and set in the storage unit 58. A criterion of the hunting condition is stored in the storage unit 58. The storage unit 58 is formed of a nonvolatile memory such as EEPROM (Electrically Erasable Programmable Read-Only Memory), for example.

The monitoring unit 55 includes a current monitoring unit (an example of a current detection unit) 56, and a position monitoring unit (an example of a rotation position detection unit) 57. The coil current signal and the position switching signal are input to the monitoring unit 55, the coil current signal being output from the inverter circuit 2, and the position switching signal being output from the FG signal generation unit 33. The current monitoring unit 56 and the position monitoring unit 57 of the monitoring unit 55 monitor as follows at predetermined intervals, and the monitoring unit 55 outputs the detection results to the hunting determination unit 52.

The current monitoring unit 56 detects a magnitude of the coil current flowing through the coils La, Lb of the motor 20 based on the input coil current signal. Specifically, the coil current signal is input to the current monitoring unit 56. A voltage corresponding to a predetermined first current threshold is input to the current monitoring unit 56, the voltage being output from the storage unit 58. The current monitoring unit 56 is, for example, a comparator, and compares the coil current signal with the voltage corresponding to the first current threshold to output the compared result as a current monitoring signal. In other words, the current monitoring unit 56 compares the first current threshold with the magnitude of the coil current. The current monitoring signal is a signal indicating whether or not the coil current is larger than the first current threshold, and for example, a high/low signal indicating whether or not the coil current exceeds the first current threshold is output. The current monitoring signal is output to the hunting determination unit 52.

The position monitoring unit 57 outputs a position monitoring signal based on the input position switching signal. In other words, the position monitoring unit 57 detects the rotation position of the motor 20 based on the position information, and outputs the position monitoring signal. The position monitoring signal is input to the hunting determination unit 52 and the motor control unit 51. The position monitoring signal is a signal indicating the rotational speed of the motor 20 in a pseudo manner. Note that in a position detection method using one rotation position detector, when the motor is in the hunting condition, detection is made as if the motor is rotated at low speed even though the motor is not actually rotated. In the present disclosure, the rotational speed detected in the hunting condition is referred to as a pseudo rotational speed.

The hunting determination unit 52 determines, based on the current monitoring signal, the position monitoring signal, and the rotational speed command signal, whether the motor 20 is in the hunting condition. In other words, the hunting determination unit 52 determines, based on the magnitude of the coil current, the rotation position of the motor 20, and the rotational speed command signal, whether or not the motor 20 is in the hunting condition.

The hunting determination unit 52 includes a current determination unit 53 and a position determination unit 54.

The current determination unit 53 determines whether or not a first determination condition is satisfied based on the current monitoring signal, i.e., based on the comparison result of the coil current with the first current threshold. In the present embodiment, the first determination condition is that the coil current is larger than the first current threshold (an example of a predetermined abnormal condition). When the coil current is larger than the first current threshold, the current monitoring signal is output from the current monitoring unit 56 accordingly. The current determination unit 53 determines that the first determination condition is satisfied based on the current monitoring signal.

The position determination unit 54 determines whether or not the second determination condition is satisfied based on a comparison result of the pseudo rotational speed of the motor 20 obtained based on the detection result of the rotational position of the motor 20 with a predetermined rotational speed threshold, and the rotational speed command signal input as the driving command to the control circuit unit 5. Specifically, the position determination unit 54 determines whether or not the pseudo rotational speed of the motor 20 (hereinafter may be simply referred to as a rotational speed) is smaller than the predetermined rotational speed threshold stored in the storage unit 58 based on the position monitoring signal output from the position monitoring unit 57. When the rotational speed of the motor 20 is slower than the rotational speed threshold, and the rotational speed of the motor 20 is slower than the rotational speed specified by the rotational speed command signal, the position determination unit 54 determines that the second determination condition is satisfied. In other words, the second determination condition is that the pseudo rotational speed of the motor 20 is slower than the predetermined rotational speed and is slower than the rotational speed specified by the rotational speed command signal. For example, a value above the pseudo rotational speed detected when the motor 20 is in the hunting condition is set as the predetermined rotational speed threshold.

In the present embodiment, the hunting determination unit 52 determines that the motor 20 is in the hunting condition when a state of satisfying the first determination condition and the second determination condition is maintained for a predetermined determination time (predetermined time). In other words, the hunting determination unit 52 detects a predetermined abnormal condition of satisfying both the first determination condition and the second determination condition based on the current monitoring signal, the position monitoring signal, and the rotational speed command signal. The abnormal condition is that the motor 20 may be in the hunting condition. A hunting counter counts the predetermined determination time passed from when the abnormal condition is detected. The determination time can be arbitrarily set.

The hunting determination unit 52 outputs the high/low signal to the motor control unit 51 in accordance with the determination result whether the motor 20 is in the hunting condition. The motor control unit 51 performs the drive control of the motor 20 based on the input signal.

The motor control unit 51 outputs to the predrive circuit 3 the drive control signal for controlling the drive of the motor 20. The rotational speed command signal is input as the driving command to the motor control unit 51. The motor control unit 51 outputs the input rotational speed command signal as the drive control signal in normal time. In the present embodiment, the rotational speed command signal and the drive control signal each are a PWM (pulse width modulation) signal. Note that the form of the signal is not limited to the PWM signal, and may be a PFM (pulse frequency modulation) signal or the like.

The motor control unit 51 outputs the drive control signal for stopping the motor 20 when the motor 20 is determined to be in the hunting condition as described below. The position monitoring signal is input to the motor control unit 51. The motor control unit 51 determines, based on the rotational speed command signal and the position monitoring signal, whether or not the motor 20 is in a locked state. In other words, when it is detected based on the position monitoring signal that the motor 20 is not rotating even though the rotational speed command signal for rotating the motor 20 is input, the motor control unit 51 determines that the motor 20 is in the locked state. In this case, the motor control unit 51 stops the drive of the motor 20 (lock protection state) for a predetermined lock protection period (an example of a second period of time). The lock protection period is a period from the time the control is performed to stop the motor 20 when the motor 20 is locked to the time the control is performed to restart the motor 20. In the lock protection state, the motor control unit 51 outputs a PWM signal having a zero percent duty cycle for stopping the drive of the motor 20 as the drive control signal. When the lock protection period elapses, the motor control unit 51 restarts the motor 20 in accordance with the rotational speed command signal.

The motor control unit 51 generates a drive control signal based on the input rotational speed command signal and the determination result for the hunting condition, and outputs the drive control signal to the predrive circuit 3. When the hunting determination unit 52 determines that the motor 20 is in the hunting condition, the motor control unit 51 outputs the PWM signal having a zero percent duty cycle to the predrive circuit 3 to bring the motor 20 into the lock protection state. In other words, when the hunting determination unit 52 determines that the motor 20 is in the hunting condition, the motor control unit 51 outputs the drive control signal for stopping the motor 20. Then, the drive of the motor 20 can be stopped to prevent a continuous drive operation for rotating the motor 20 in the hunting condition based on the rotational speed command signal.

When the hunting determination unit 52 determines that the motor 20 is in the hunting condition, the motor control unit 51 maintains the state of outputting the drive control signal for stopping the motor 20 for a predetermined first period of time. The predetermined first period of time is longer than a predetermined second period of time from the time the control is performed to stop the motor 20 when the motor 20 is locked to the time the control is performed to restart the motor 20. Specifically, when the hunting determination unit 52 determines that the motor 20 is in the hunting condition, the motor control unit 51 maintains the state of controlling in order to bring the motor 20 into the lock protection state (outputting the PWM signal having a zero percent duty cycle) for a hunting protection period (an example of the first period of time). The hunting protection period is a period from the time the control is performed to stop the motor 20 when it is determined that the motor 20 is in the hunting condition to the time the control is performed to restart the motor 20. When the hunting protection period elapses after the hunting condition occurs and the control is performed to bring the motor 20 into the lock protection state, the motor control unit 51 attempts to drive the motor 20 in accordance with the rotational speed command signal again. The hunting protection period can be set by obtaining an appropriate period from an experiment or the like. Note that the hunting protection period is previously set to be longer than the lock protection period for continuing the lock protection state when the motor 20 is locked.

Figure 3:
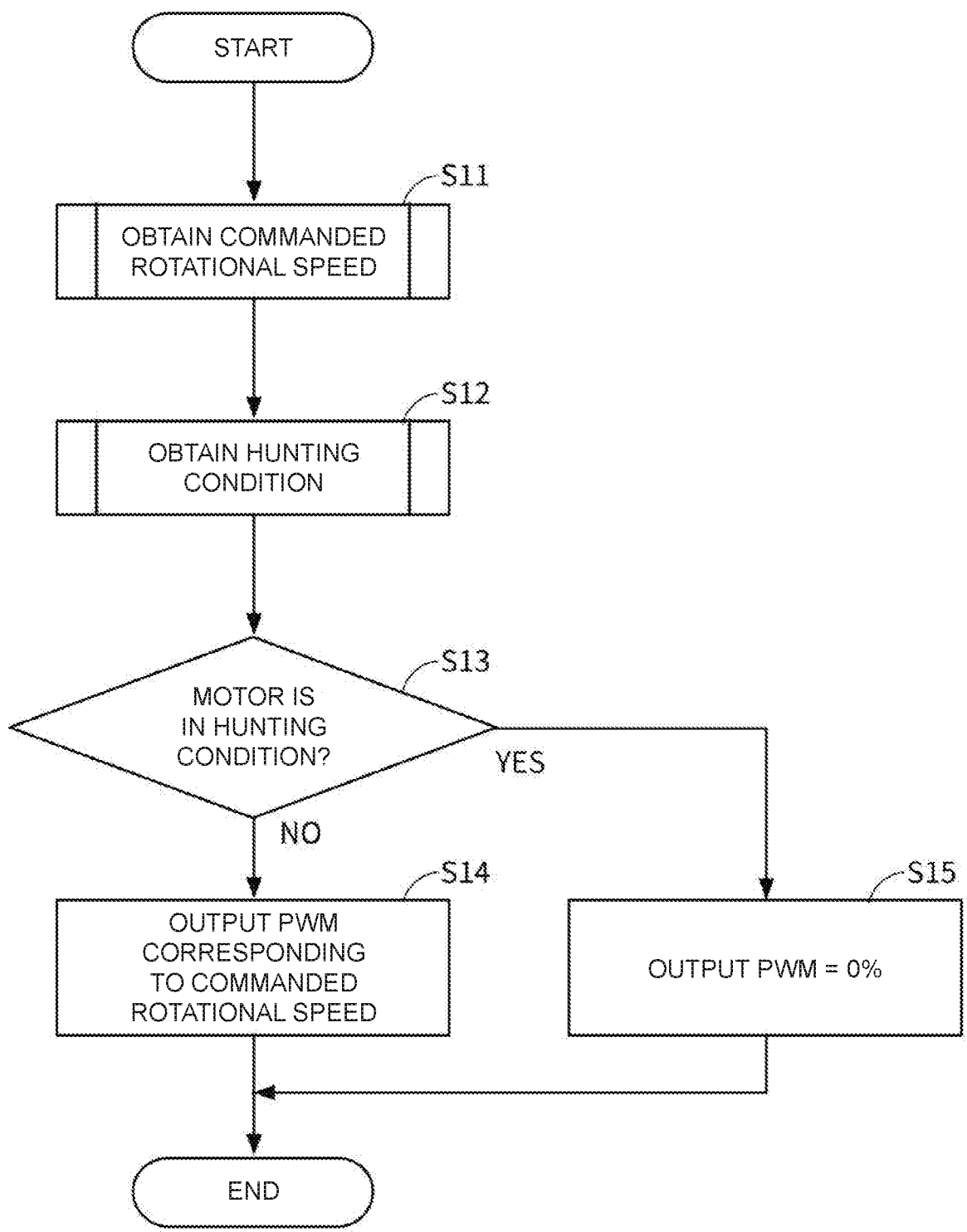
FIG. 3 is a flowchart illustrating an operation of the motor drive control device.

FIG. 3 is a flowchart illustrating an operation of the motor drive control device 1.

Each process illustrated in FIG. 3 is performed by the control circuit unit 5.

As illustrated in FIG. 3, in step S11, the control circuit unit 5 obtains a commanded rotational speed based on the input rotational speed command signal.

In step S12, the control circuit unit 5 performs a hunting condition obtaining process.

In step S13, the hunting determination unit 52 determines whether or not the motor 20 is in the hunting condition.

When it is determined in step S13 that the motor 20 is not in the hunting condition, in step S14, the motor control unit 51 outputs to the predrive circuit 3 the PWM signal having a duty cycle in accordance with the commanded rotational speed as the drive control signal.

On the other hand, when it is determined in step S13 that the motor 20 is in the hunting condition, in step S15, the motor control unit 51 outputs to the predrive circuit 3 the PWM signal having a zero percent duty cycle as the drive control signal regardless of the commanded rotational speed. Then, the motor 20 is brought into the lock protection state to stop the drive of the motor 20.

When the process in step S14 or the process in step S15 is completed, a series of processes are completed. The series of processes is repeatedly performed.

As described below, a control method for the motor drive control device 1 according to the present embodiment includes a current detection step of detecting a magnitude of a coil current flowing through coils La, Lb of the motor 20, a rotation position detection step of detecting a rotation position of the motor 20 based on the position information, and a hunting determination step of determining, based on the magnitude of the coil current, the rotation position of the motor 20, and a driving command for driving the motor 20, whether or not the motor 20 is in a hunting condition.

Figure 4:
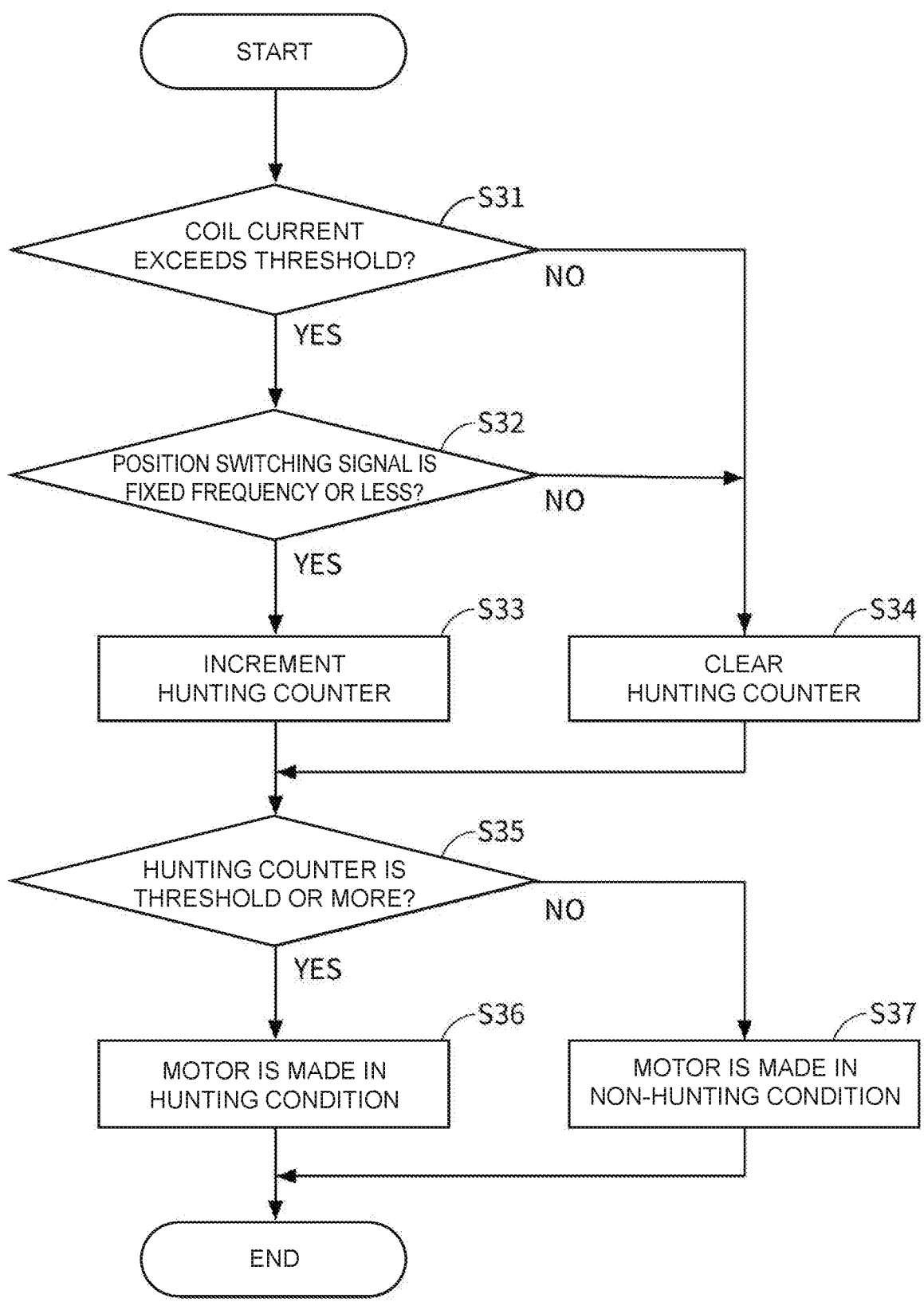
FIG. 4 is a flowchart illustrating an operation of a hunting condition obtaining process.

FIG. 4 is a flowchart illustrating an operation of the hunting condition obtaining process.

Although not illustrated in FIG. 4, the current monitoring unit 56 of the monitoring unit 55 detects the magnitude of the coil current flowing through the coils La, Lb of the motor 20 based on the input coil current signal (current detection step) as described above, and outputs the current monitoring signal to the current determination unit 53 of the hunting determination unit 52. The position monitoring unit 57 of the monitoring unit 55 detects the rotation position of the motor 20 based on the position information (rotation position detection step), and outputs the position monitoring signal to the position determination unit 54 of the hunting determination unit 52.

As illustrated in FIG. 4, in step S31, the current determination unit 53 of the hunting determination unit 52 determines, based on the current monitoring signal from the current monitoring unit 56, whether or not the coil current of the motor 20 exceeds the first current threshold (determination on the first determination condition).

If it is determined in step S31 that the coil current exceeds the first current threshold (if "YES"), in step S32 the position determination unit 54 of the hunting determination unit 52 determines whether or not the position switching signal is at a fixed frequency or less when the rotational speed command signal is input. In other words, it is determined whether or not the rotational speed of the motor 20 is the predetermined rotational speed threshold or less (determination on the second determination condition).

If it is determined in step S32 that the rotational speed is the rotational speed threshold or less (if "YES"), the process proceeds to step S33. If "NO" in step S31 or step S32, the process proceeds to step S34.

Note that the order of the process in step S31 and the process in step S32 is not limited to this order, and step S31 and step S32 may be performed in reverse order or in parallel.

In step S33, the hunting determination unit 52 increments the hunting counter. Then, the hunting determination unit 52 performs clocking to determine whether the determination time for determining whether or not the motor 20 is in the hunting condition elapses. The counter is incremented by counting a clock signal.

On the other hand, in step S34, the hunting determination unit 52 clears the hunting counter. Then the hunting determination unit 52 is adapted to start the clocking of the predetermined determination time when the first determination condition and the second determination condition are thereafter satisfied and the possibility that the motor 20 is in the hunting condition is generated.

When step S33 or step S34 is performed, the process in step S35 is performed. In step S35 the hunting determination unit 52 determines whether or not a count value of the hunting counter is the threshold or greater. In other words, the hunting determination unit 52 determines whether or not the predetermined determination time elapses in a state in which the first determination condition and the second determination condition are satisfied. After the predetermined determination time elapses, the process proceeds to step S36, and otherwise, the process proceeds to step S37.

In step S36, the hunting determination unit 52 determines the motor 20 is in the hunting condition (hunting determination step). On the other hand, in step S37, the hunting determination unit 52 determines that the motor 20 is in a non-hunting condition (determines that the motor 20 is not in the hunting condition). When any one of the processes is performed, the hunting condition obtaining process is completed, and the process is returned to the process illustrated in FIG. 3.

Figure 5:
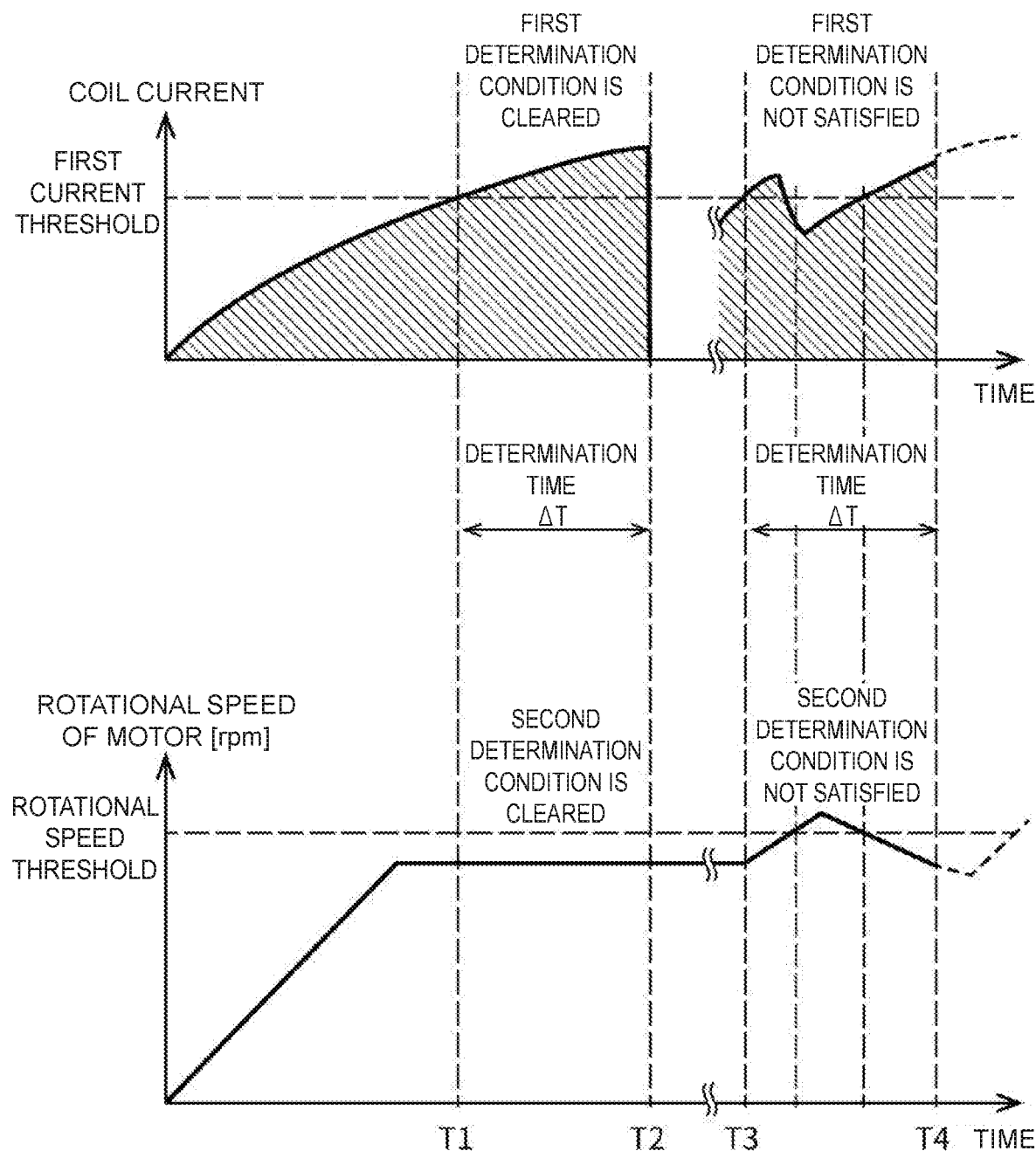
FIG. 5 shows graphs for explaining a first determination condition and a second determination condition, respectively.

FIG. 5 shows graphs for explaining the first determination condition and the second determination condition, respectively.

In FIG. 5, an upper column shows a graph representing time on the horizontal axis and the coil current on the vertical axis, and the first current threshold is indicated by a broken line. A lower column shows a graph representing time on the horizontal axis and the rotational speed of the motor 20 (corresponding to the frequency of the position switching signal), and the rotational speed threshold is indicated by a broken line. In FIG. 5, examples of transition images of the coil current and the rotational speed when the motor 20 is driven are shown in the upper and lower graphs, respectively.

When the coil current exceeds the first current threshold at a time T1 and the first determination condition is cleared (satisfied) while the rotational speed is the rotational speed threshold or less and the second determination condition is cleared, the clocking of the determination time Δt is started. When both the first determination condition and the second determination condition are cleared from the time T1 to a time T2 after the lapse of the determination time Δt, it is determined at the time T2 that the motor 20 is in the hunting condition.

On the other hand, it is assumed that the clocking of the determination time Δt is started when the coil current exceeds the first current threshold at a time T3 and the first determination condition is cleared while the rotational speed is the rotational speed threshold or less and the second determination condition is cleared. At this time, when the coil current is below the first current threshold and the rotational speed exceeds the rotational speed threshold in a period from the time T3 to a time T4 after the lapse of the determination time Δt, the clocking of the determination time Δt is reset at that time, and therefore the clocking of the determination time Δt is not completed at the time T4. In such a case, it is not determined at time T4 that the motor 20 is in the hunting condition.

Figure 6:
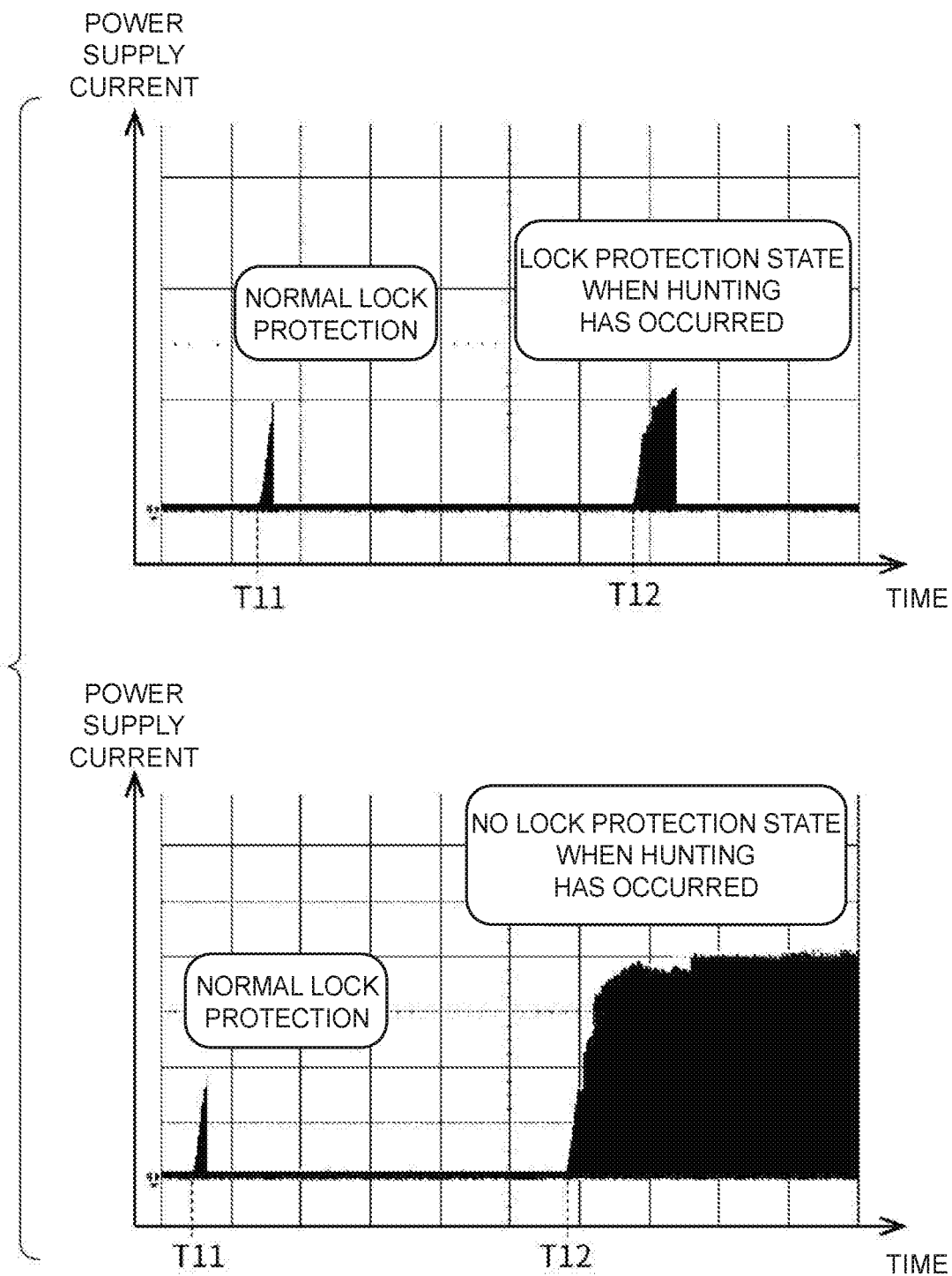
FIG. 6 shows waveform charts each showing a transition of a power supply current when a hunting condition has occurred.

FIG. 6 shows waveform charts each showing a transition of the power supply current when the hunting condition has occurred.

In FIG. 6, an upper waveform chart shows a case where the control is performed when the hunting condition has occurred as in the above-described present embodiment, and a lower waveform chart shows a case where the control is not performed as in the present embodiment.

It is assumed that the motor 20 is in the locked state when the drive of the motor 20 is started at a time T11. At this time, it is immediately detected, based on the position monitoring signal, that the motor 20 is in the locked stated, and the drive of the motor 20 is stopped (lock protection state).

Thereafter, it is assumed that the hunting has occurred when the motor 20 is restarted at a time T12 after the lapse of the lock protection period. At this time, when the determination of the hunting condition and the control are not performed as shown in the lower waveform chart, the hunting has occurred, but the control is performed to increase the power supply current. When the hunting has occurred, it is determined that the motor 20 is rotated at the low speed so that the control is performed to increase the power supply current to rotate the motor 20 at a speed corresponding to the rotational speed command signal. This state is continued until the driving command for stopping the motor 20 is issued, resulting in causing heat generation in the motor 20.

Meanwhile, in the present embodiment, as shown in the upper waveform chart, it is determined that the motor 20 is in the hunting condition after the lapse of the predetermined determination time from the time when the power supply current exceeds the first current threshold after the drive is started at the time T12, and then the drive of the motor 20 is stopped (lock protection state). Therefore, the motor 20 can be prevented from generating heat.

As described above, in the present embodiment, the hunting condition can be precisely determined based on the coil current signal and the position switching signal. Therefore, in the motor drive control device 1 having a simple circuit configuration driving the motor provided with only one rotation position detector 4, and the motor drive control device 1 having a simple circuit configuration using an integrated circuit with the small number of terminals such that only output of one rotation position detector 4 among a number of sensors is used for the drive control, the hunting condition can be precisely determined. In other words, in a three-phase motor of a three-sensor system, for example, when the motor 20 is in the hunting condition, the energization phase is not switched in a normal time, and the hunting condition can be easily detected. However, in a single-phase motor, or a three-phase motor of a one-sensor system, the hunting condition cannot be detected in the above-described manner. Meanwhile, in the present embodiment, the hunting condition can be detected with high accuracy even when the single-phase motor, the three-phase motor of the one-sensor system or the like is driven.

The drive control signal is output to the predrive circuit 3 in a form of the PWM signal similar to the rotational speed command signal. Accordingly, even if a circuit configuration directly inputting the rotational speed command signal to the conventional predrive circuit 3 is employed, the control circuit unit 5 as in the present embodiment is inserted in a preceding stage of the predrive circuit 3 to input the rotational speed command signal to the control circuit unit 5, thereby easily preventing the hunting condition from occurring. In other words, the existing integrated circuit formed to perform the overcurrent determination by the predrive circuit 3 is used in combination with an integrated circuit formed at a low cost to perform current determination for the hunting determination, so that the hunting can be detected with high accuracy and the manufacturing cost of the motor drive control device 1 can be reduced.

When it is determined that the motor 20 is in the hunting condition, an output time period of the PWM signal having a zero percent duty cycle is secured to be longer than the time period from a normal lock protection period to the time of starting the motor 20, thereby being capable of reducing the temperature of the coil which is slightly generating heat due to the occurrence of the hunting. Accordingly, when the motor 20 is thereafter restarted, the motor 20 can be stably restarted.

Others

The configuration of the control circuit unit is not limited to the above-described embodiment. The first current threshold and the rotational speed threshold are stored in the storage unit, but these thresholds may be stored in the monitoring unit or the other places. The various thresholds may be prepared in multiple stages according to a level of the other signal such as the rotational speed command signal. Also, the threshold may be calculated in the monitoring unit or the like every time the control is performed, thus the storage unit is not required.

The control circuit unit is not necessarily limited to a unit outputting the drive control signal of the same form as the rotational speed command signal, and may be formed to output a signal for controlling the drive of the predrive circuit. In other words, when it is determined that the hunting condition has occurred, the control circuit unit may output a signal for stopping the motor to a subsequent system for driving the motor in the motor drive control device.

A flow of processes performed by the control circuit unit is not limited to the flow illustrated in the above-described flowchart. Another process of step may be interrupted between processes of the steps illustrated in the above-described flowchart, for example.

The configuration of the rotation position detector is not particularly limited to the above-described configuration. In this case, a configuration detecting the rotation position of the rotor based on the detection result of the rotation position detector can be appropriately changed.

Rotational speed command information may be input from the outside or inside of the motor drive control device, or from both of the outside and inside of the motor drive control device. The driving command of the motor input to the motor drive control device is not limited to the PWM signal and the PFM signal commanding the rotational speed and the torque, and the motor device control device may be formed to input a serial value or the like.

The control circuit unit is adapted to output, to a device side using the motor drive control device, a life signal indicating whether or not the motor is in a drivable state based on the determination result of the hunting condition.

The process in the above-described embodiment may be performed by software or using a hardware circuit.

It is possible to provide a program performing the process described in the above-described embodiment, or provide, to a user, a recording medium such as a CD-ROM, a flexible disk, a hard disk, a ROM, a RAM, a memory card, or the like, the recording medium recording the program. The program may be downloaded into the device through a communication means such as Internet or the like. The process described in the sentence in the above-described flowchart is performed by a CPU or the like in accordance with the program.

The above-described embodiment should be considered in all respects to be illustrative and not restrictive. The scope of the present disclosure is indicated by the appended claims rather than the foregoing description, and all changes that come within the meaning and range equivalent to the claims are intended to be included therein.

What is claimed is:

1. A motor drive control device driving a motor using position information detected by one sensor, comprising:
    a current detection unit detecting a magnitude of a coil current flowing through a coil of the motor;
    a rotation position detection unit detecting a rotation position of the motor based on the position information; and
    a hunting determination unit determining, based on the magnitude of the coil current, the rotation position of the motor, and a rotational speed command signal as a driving command for driving the motor, whether or not the motor is in a hunting condition, wherein
    the hunting determination unit includes:
    a current determination unit determining that the first determination condition is satisfied when the coil current is larger than the first current threshold; and
    a position determination unit determining that the second determination condition is satisfied when a pseudo rotational speed of the motor obtained based on the detection result of the rotation position of the motor is slower than the predetermined rotational speed and the pseudo rotational speed of the motor is slower than the rotational speed specified by the rotational speed command signal, wherein
    the hunting determination unit determines that the motor is in the hunting condition when the first determination condition is satisfied and the second determination condition is satisfied.

2. The motor drive control device according to claim 1, wherein
    the hunting determination unit determines that the motor is in the hunting condition when the first determination condition and the second determination condition are satisfied for a predetermined time.

3. The motor drive control device according to claim 1, further comprising:
    a predrive circuit driving an inverter circuit supplying power to the motor, wherein
    the predrive circuit includes an overcurrent determination unit comparing the coil current with a second current threshold to determine whether or not the motor is in an overcurrent state, and
    the second current threshold is larger than the first current threshold.

4. The motor drive control device according to claim 1, further comprising:
    a predrive circuit driving an inverter circuit supplying power to the motor; and
    a motor control unit outputting to the predrive circuit a drive control signal for controlling the drive of the motor based on the driving command, wherein
    the motor control unit outputs the drive control signal for stopping the motor when the hunting determination unit determines that the motor is in the hunting condition.

5. The motor drive control device according to claim 4, wherein
    the motor control unit maintains a state of outputting the drive control signal for stopping the motor for a predetermined first period of time when the hunting determination unit determines that the motor is in the hunting condition, and
    the predetermined first period of time is longer than a predetermined second period of time from the time a control is performed to stop the motor when the motor is locked to the time a control is performed to restart the motor.

6. A motor drive control device driving a motor using position information detected by one sensor, comprising:
    a current detection unit detecting a magnitude of a coil current flowing through a coil of the motor;
    a rotation position detection unit detecting a rotation position of the motor based on the position information;
    a hunting determination unit determining, based on the magnitude of the coil current, the rotation position of the motor, and a rotational speed command signal as a driving command for driving the motor, whether or not the motor is in a hunting condition, and
    a predrive circuit driving an inverter circuit supplying power to the motor, wherein
    the hunting determination unit includes:
    a current determination unit determining that the first determination condition is satisfied when the coil current is larger than the first current threshold; and
    a position determination unit determining that the second determination condition is satisfied when a pseudo rotational speed of the motor obtained based on the detection result of the rotation position of the motor is slower than the predetermined rotational speed and the pseudo rotational speed of the motor is slower than the rotational speed specified by the rotational speed command signal, wherein
    the hunting determination unit determines that the motor is in the hunting condition when the first determination condition is satisfied and the second determination condition is satisfied, wherein:
    the predrive circuit includes an overcurrent determination unit comparing the coil current with a second current threshold to determine whether or not the motor is in an overcurrent state, and
    the second current threshold is larger than the first current threshold.

7. A motor drive control device driving a motor using position information detected by one sensor, comprising:
    a current detection unit detecting a magnitude of a coil current flowing through a coil of the motor;
    a rotation position detection unit detecting a rotation position of the motor based on the position information;
    a hunting determination unit determining, based on the magnitude of the coil current, the rotation position of the motor, and a rotational speed command signal as a driving command for driving the motor, whether or not the motor is in a hunting condition;
    a predrive circuit driving an inverter circuit supplying power to the motor; and
    a motor control unit outputting to the predrive circuit a drive control signal for controlling the drive of the motor based on the driving command, wherein
    the hunting determination unit includes:
    a current determination unit determining that the first determination condition is satisfied when the coil current is larger than the first current threshold; and a position determination unit determining that the second determination condition is satisfied when a pseudo rotational speed of the motor obtained based on the detection result of the rotation position of the motor is slower than the predetermined rotational speed and the pseudo rotational speed of the motor is slower than the rotational speed specified by the rotational speed command signal, wherein the hunting determination unit determines that the motor is in the hunting condition when the first determination condition is satisfied and the second determination condition is satisfied, wherein the motor control unit maintains a state of outputting the drive control signal for stopping the motor for a predetermined first period of time when the hunting determination unit determines that the motor is in the hunting condition, and the predetermined first period of time is longer than a predetermined second period of time from the time a control is performed to stop the motor when the motor is locked to the time a control is performed to restart the motor.

* * * * *